United States Patent [19]
Thompson et al.

[11] Patent Number: 5,424,713
[45] Date of Patent: Jun. 13, 1995

[54] OVERHEAD OBSTRUCTION DETECTOR FOR A VEHICLE

[76] Inventors: Horace E. Thompson, 7724 S. May St.; Edward E. Isaacs, 7722 S. May St., both of Chicago, Ill. 60620

[21] Appl. No.: 269,013
[22] Filed: Jun. 30, 1994
[51] Int. Cl.$^6$ ............................................. B60Q 1/00
[52] U.S. Cl. ................................ 340/436; 340/438; 200/61.44
[58] Field of Search ............... 340/435, 436, 437, 901, 340/438; 200/61.44, 61.42; 116/28 R, 28 A

[56] References Cited

U.S. PATENT DOCUMENTS

| | | | |
|---|---|---|---|
| 2,834,002 | 5/1958 | Nordsiek | 340/436 |
| 3,269,783 | 8/1966 | Kritz | 340/436 X |
| 5,276,426 | 1/1994 | LoBello | 340/436 |

Primary Examiner—Jeffery A. Hofsass

[57] ABSTRACT

An overhead warning detector. Such detector includes a terminal box positionable on top of a truck cab. A vertically extending fixed member is fixedly positioned with respect to the terminal box. A vertically extending rotatable member is rotatably secured to the fixed member. A bridge feeler extends radially from the rotatable member. The feeler is adjustable in height to an elevation corresponding to the elevational orientation of the highest point of the trailer of the truck. A resilient means interconnecting the fixed and rotatable members tending to hold the bridge feeler in an angle offset forwardly from the vertical but to allow rotation of the rotatable member and feeler rearwardly in response to contact with a low bridge. A control box is positionable in the cab of the truck with electrical leads coupling the fixed and rotatable members. The control panel has an alarm actuatable in response to the rotation of the rotatable member to activate the alarm.

7 Claims, 5 Drawing Sheets

OVERHEAD OBSTRUCTION DETECTOR FOR A VEHICLE

BACKGROUND OF THE INVENTION

1. Field of the Invention

The present invention relates to a new and improved overhead warning detector and, more particularly, pertains to gauging the height of a bridge, guiding the driver, detecting if the bridge is too low and warning the driver of a low bridge through an alarm.

2. Description of the Prior Art

The use of vehicle warning and clearing systems of various designs and configurations is known in the prior art. More specifically, vehicle warning and clearing systems of various designs and configurations heretofore devised and utilized for the purpose of detecting low bridges or other overhead obstructions and providing a warning in response thereto through a wide variety of methods and devices are known to consist basically of familiar, expected, and obvious structural configurations, notwithstanding the myriad of designs encompassed by the crowded prior art which has been developed for the fulfillment of countless objectives and requirements.

The prior art discloses a large number of vehicle warning and clearing systems of various designs and configurations. By way of example, U.S. Pat. No. 3,716,833 to Roth discloses a vehicle height clearance indicating apparatus.

U.S. Pat. No. 3,720,916 to Edgar discloses a vehicle detection and indication apparatus for overhead obstructions.

U.S. Pat. No. 3,769,931 to Babut discloses a low overhead warning device.

U.S. Pat. No. 3,946,360 to Serritella discloses a vehicle warning system.

Lastly, U.S. Pat. No. 4,237,446 to Roberts discloses a vehicle clearance detector.

In this respect, the overhead warning detector according to the present invention substantially departs from the conventional concepts and designs of the prior art, and in doing so provides an apparatus primarily developed for the purpose of gauging the height of a bridge, guiding the driver, detecting if the bridge is too low and warning the driver of a low bridge through an alarm.

Therefore, it can be appreciated that there exists a continuing need for a new and improved overhead warning detector which can be used for gauging the height of a bridge, guiding the driver, detecting if the bridge is too low and warning the driver of a low bridge through an alarm. In this regard, the present invention substantially fulfills this need.

SUMMARY OF THE INVENTION

In view of the foregoing disadvantages inherent in the known types of vehicle warning and clearing systems of various designs and configurations now present in the prior art, the present invention provides a new and improved overhead warning detector. As such, the general purpose of the present invention, which will be described subsequently in greater detail, is to provide a new and improved overhead warning detector and methods which have all the advantages of the prior art and none of the disadvantages.

To attain this, the present invention essentially comprises a new and improved overhead warning detector comprising, in combination, a terminal box positionable on the roof of a truck cab; a vertically extending fixed member with a first cylindrical recess fixedly positioned with respect to the terminal box, the fixed member including a central aperture with an arcuate slot extending partly around the aperture at a common distance therefrom, the fixed member also including a circular shoulder extending therefrom with an opening over a minority of its extent with a spring retainer within the opening; a vertically extending rotatable member with a circular recess and an aperture positionable co-axial with the aperture of the fixed member, the rotatable member having a cylindrical flange positionable outboardly of the shoulder and retainer in rotatable orientation with respect thereto, the flange of the rotatable member having a radial aperture extending therethrough and a radial tab extending into the retainer; a cylindrical collar having a central aperture in axial alignment with the apertures of the rigid and rotatable members with an electrically conductive rod extending radially therefrom through the radial aperture of the rotatable member for rotation therewith, the rod also having an axial contact extending into the arcuate slot; a telescoping bridge feeler extending from the rod, the feeler being adjustable in height to an elevation essentially corresponding to the elevational height of the highest point of a trailer of the truck; a spring in resilient relationship interconnecting the tab and the retainer tending to rotate the rotatable member with respect to the fixed member and tending to hold the bridge feeler in an angle offset forwardly from the vertical but to allow rotation thereof rearwardly in response to contact with a low bridge; an arcuate contact adustably positioned with respect to the arcuate slot; electrical wires contacting the collar and arcuate contact adapted to couple the contacts upon rotation of the feeler when contacting a low bridge; and a control panel positionable in the cab with electrical lines coupling to the electrical wires, the control panel having a power source with an optical alarm and an audio alarm actuatable in response to the making of the contacts of the electrical wires, the control panel also having a switch to de-couple the power source from the contacts to inactivate the detector.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved overhead warning detector which has all the advantages of the prior art vehicle warning and clearing systems of various designs and configurations and none of the disadvantages.

It is another object of the present invention to provide a new and improved overhead warning detector which may be easily and efficiently manufactured and marketed.

It is a further object of the present invention to provide a new and improved overhead warning detector which is of a durable and reliable construction.

An even further object of the present invention is to provide a new and improved overhead warning detector which is susceptible of a low cost of manufacture with regard to both materials and labor, and which accordingly is then susceptible of low prices of sale to the consuming public, thereby making such a economically available to the buying public.

Still yet another object of the present invention is to provide a new and improved overhead warning detector which provides in the apparatuses and methods of the prior art some of the advantages thereof, while simultaneously overcoming some of the disadvantages normally associated therewith.

Even still another object of the present invention is to gauge the height of a bridge, guide the driver, detect if the bridge is too low and warn the driver of a low bridge through an alarm.

Lastly, it is an object of the present invention to provide an overhead warning detector comprising a terminal box positionable on top of a truck cab; a vertically extending fixed member fixedly positioned with respect to the terminal box; a vertically extending rotatable member rotatably secured to the fixed member; a bridge feeler extending radially from the rotatable member, the feeler being adjustable in height to an elevation corresponding to the elevational orientation of the highest point of the trailer of the truck; resilient means interconnecting the fixed and rotatable members tending to hold the bridge feeler in an angle offset forwardly from the vertical but to allow rotation of the rotatable member and feeler rearwardly in response to contact with a low bridge; a control box positionable in the cab of the truck with electrical leads coupling the fixed and rotatable members, the control panel having an alarm actuatable in response to the rotation of the rotatable member to activate the alarm.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
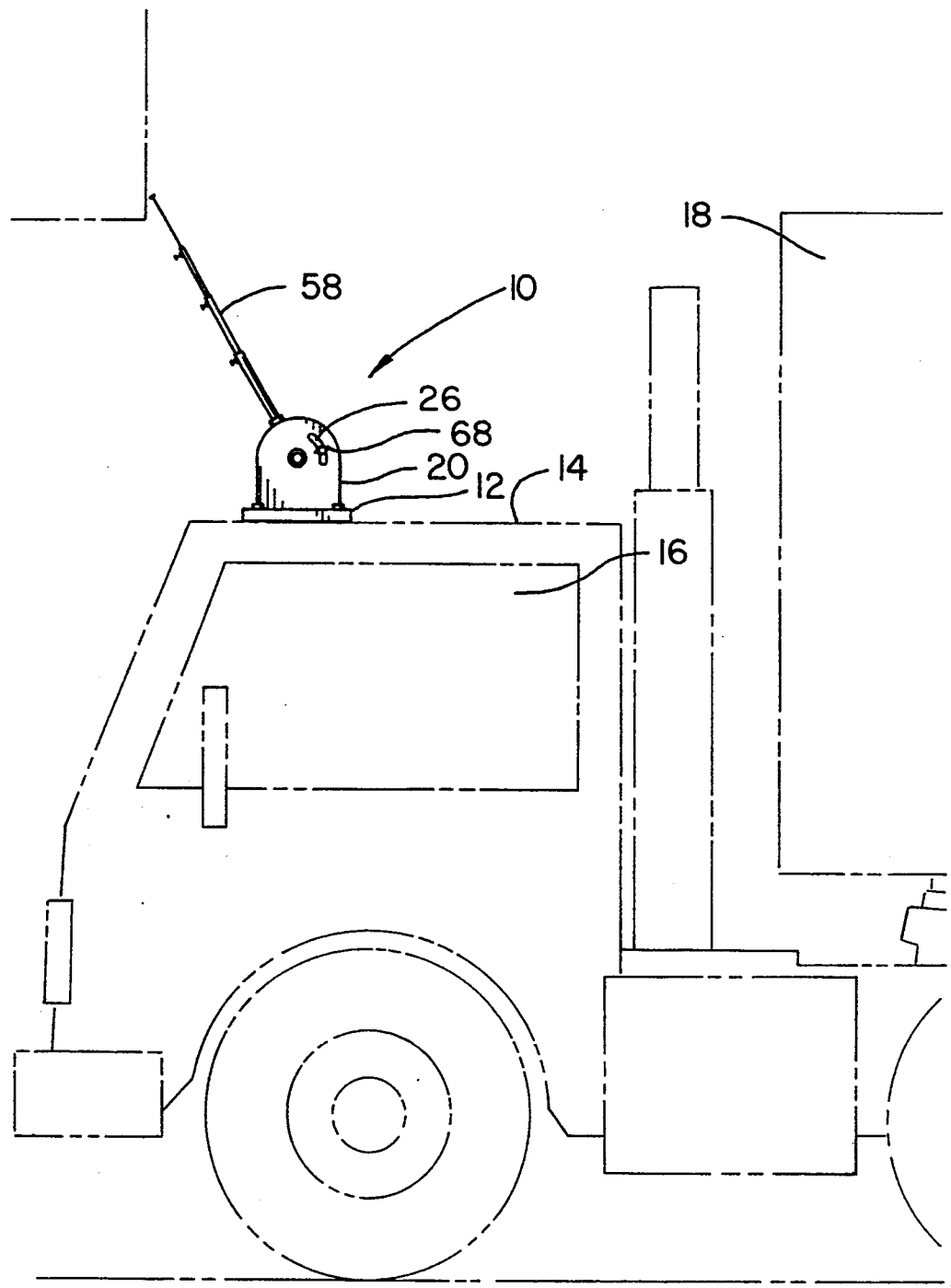
FIG. 1 is a side elevational view of the preferred embodiment of the new and improved overhead warning detector constructed in accordance with the primary embodiment of the present invention.
Figure 2:
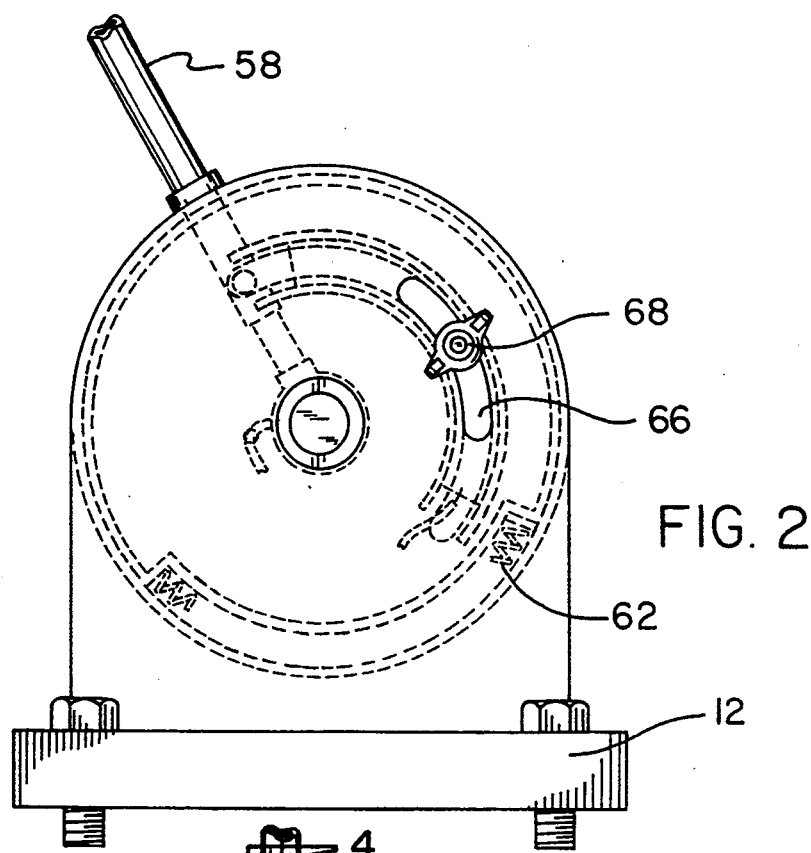
FIG. 2 is an enlarged side elevational view of the overhead warning detector shown in FIG. 1.
Figure 3:
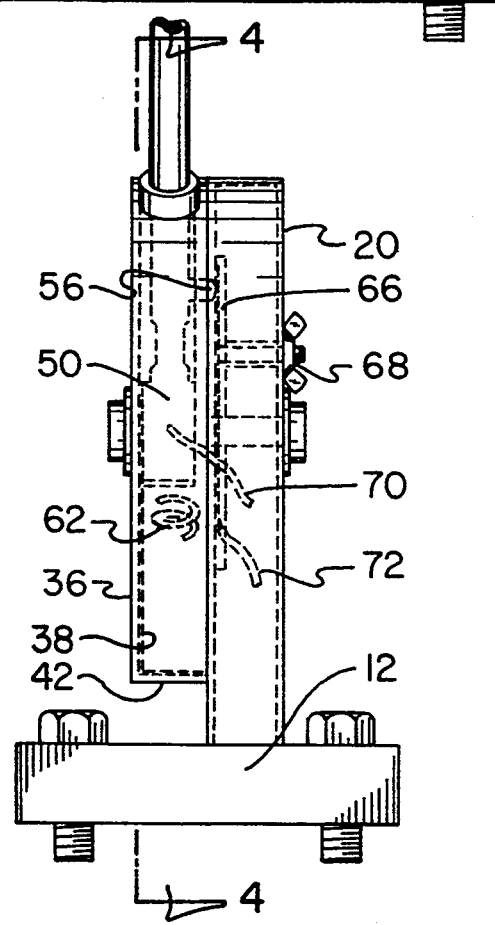
FIG. 3 is a side elevational view of the device shown in FIGS. 1 and 2.
Figure 4:
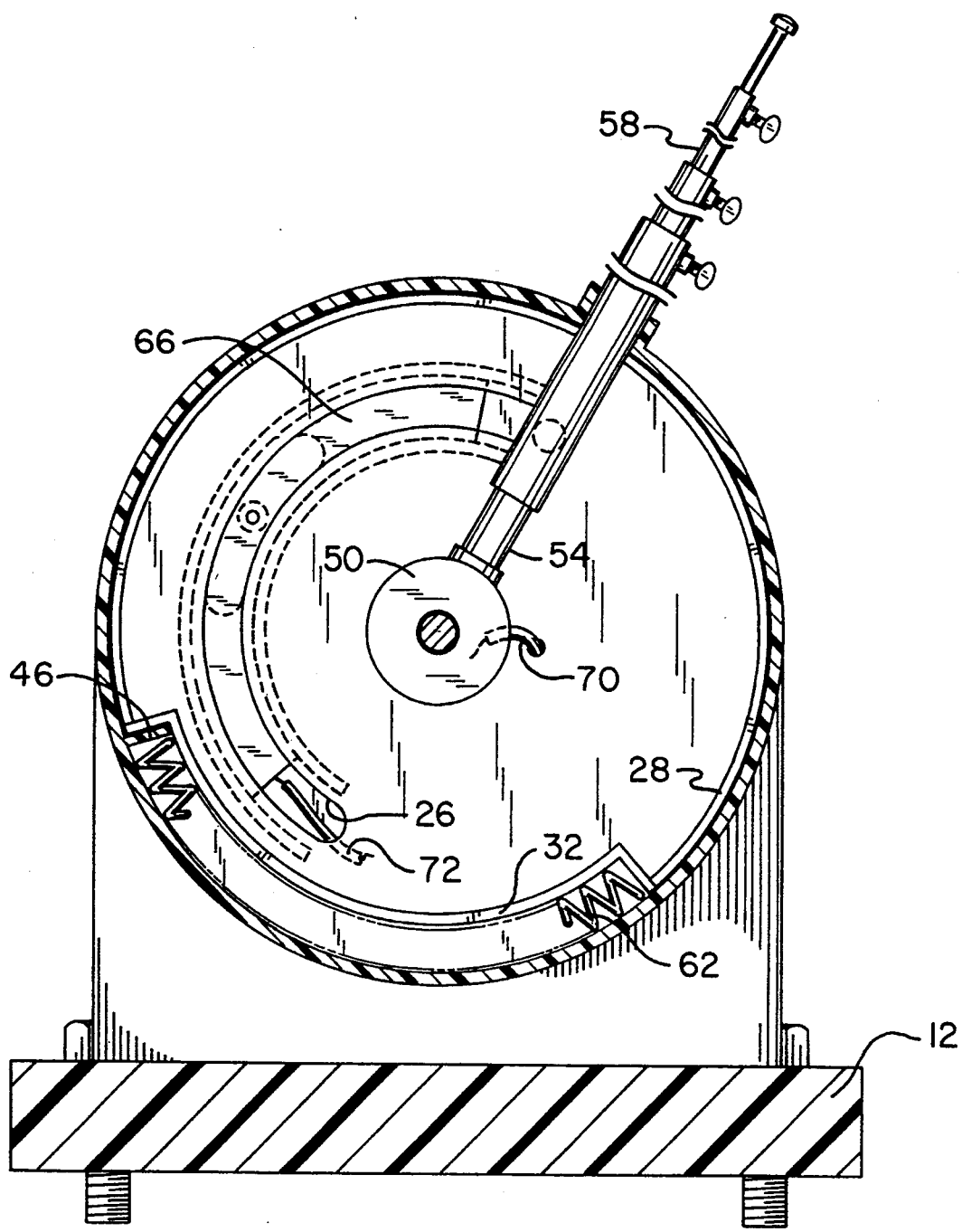
FIG. 4 is a cross-sectional view taken along line 4—4 of FIG. 3.
Figure 5:
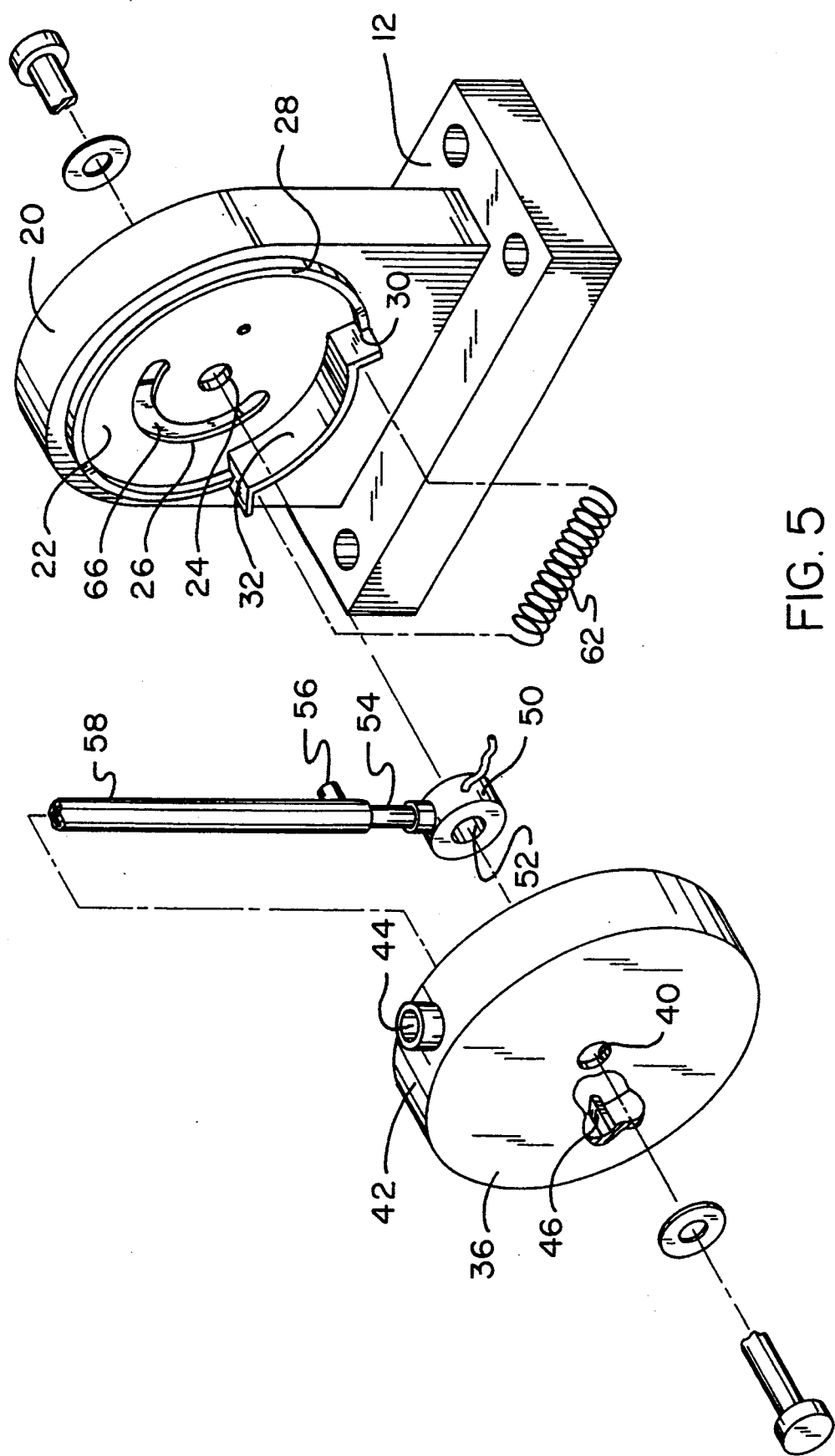
FIG. 5 is an exploded perspective view of the device of the prior Figure.
Figure 6:
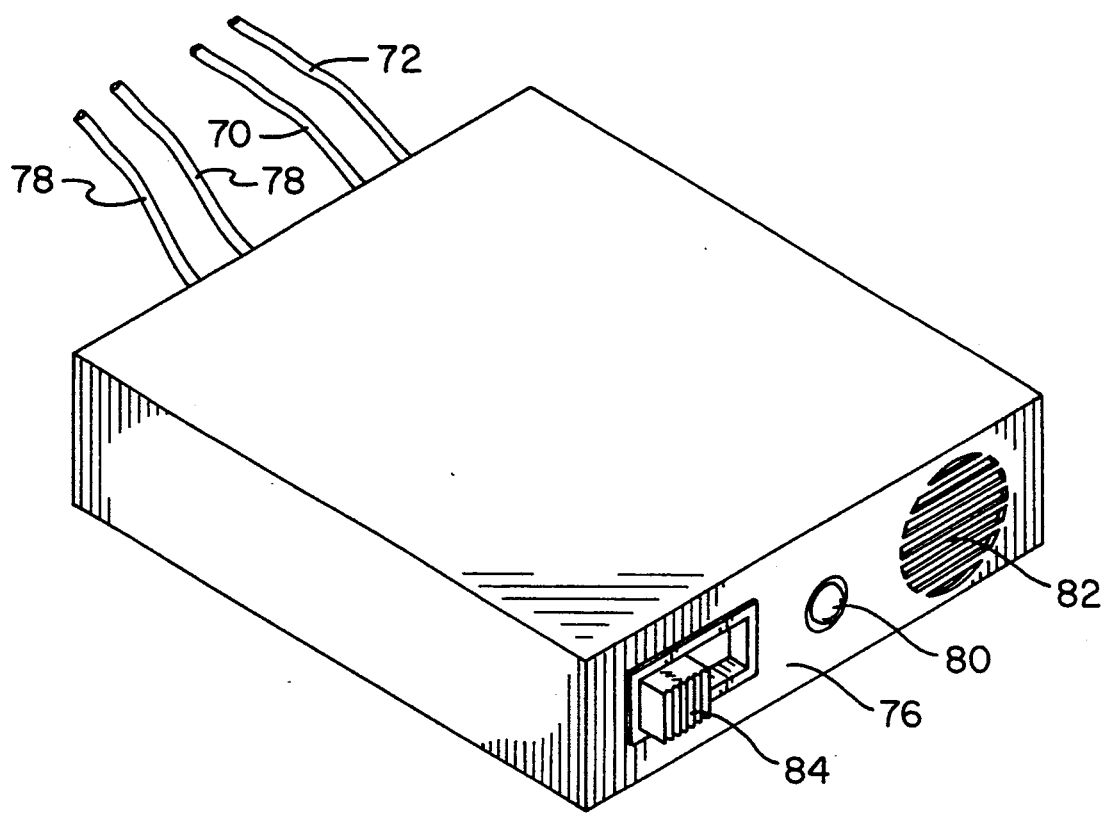
FIG. 6 is a perspective view of the control box for use in association with the device of the prior Figure.
Figure 7:
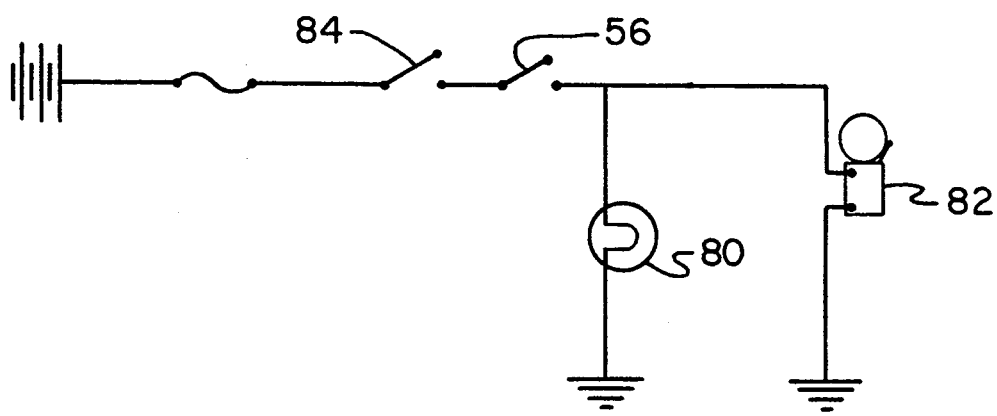
FIG. 7 is an electrical schematic showing the wiring and electrical components of the device of the prior Figure.

With reference now to the drawings, and in particular to FIGS. 1 through 7 thereof, the preferred embodiment of the new and improved overhead warning detector embodying the principles and concepts of the present invention and generally designated by the reference numeral 10 will be described.

The present invention, the new and improved overhead warning detector is a system comprised of a plurality of components. The components in their broadest context include a terminal box, a fixed member, a rotatable member, a collar, a bridge feeler, a spring, an arcuate contact, electrical wires and a control panel. Each of the individual components is specifically configured and correlated one with respect to the other to attain the desired objectives.

The first component of the system 10 is a terminal box 12. The terminal box is positioned on the roof 14 of the cab 16 of a truck 18.

A vertically extending fixed member 20 is secured above the terminal box. The fixed member has a fixed cylindrical recess 22. Such recess is positioned fixedly with the fixed member. The fixed member also includes a central aperture 24 with an arcuate slot 26. Such slot extends partly around the aperture at a common distance therefrom. The axis of the recess and aperture are perpendicular to the direction of the motion of the truck. The rigid member also includes a circular shoulder 28 extending therefrom. The shoulder also has an opening 30 over a minority of the extent of the shoulder. A spring retaining member 32 is located within the opening.

In association with the fixed member is a vertically extending rotatable member 36. The rotatable member has a circular recess 38 and an aperture 40 positionable co-axial with the aperture of the fixed member. The rotatable member also has a cylindrical flange 42 positionable outboardly of the shoulder and retainer. The flange and rotatable member are rotatably oriented and disposed with respect to the fixed member. The flange of the rotatable member has a radial aperture 44 extending therethrough and at a location generally opposite therefrom there is formed a radial tab 46 extending into the retainer.

Between the fixed member and rotatable member is a cylindrical collar 50. Such collar has a central aperture 52 in axial alignment with the apertures of the rigid and rotatable members. In addition, an electrically conductive rod 54 extends radially from the collar through the radial aperture of the rotatable member for rotation therewith. The rod also has an axial contact extending into the arcuate slot.

Actuation of the detector is through a bridge feeler 58. The bridge feeler is telescoping in nature in that it is formed of a plurality of mutually slidable sections with tightening bolts to fixedly position the end of the feeler to the desired height. The bridge feeler extends from the rod extending through the radial aperture. The feeler is adapted to be adjusted in height and positioned to an elevation essentially corresponding to the elevational height of the highest point of the truck of a trailer 60 to which it is coupled.

Next provided is a coil spring 62. The coil spring is in resilient relationship between the fixed and rotatable members. It contacts and interconnects the tab and retainer and tends to rotate the rotatable member with respect to the fixed member. Such resilience tends to hold the bridge feeler in an angle offset from the vertical. Note FIGS. 1, 2 and 4. This is a forwardly directed angle but allows rotation of the feeler and rotatable member rearwardly in response to contact with a low bridge or other obstacle which would otherwise damage the truck on which it is mounted.

Another component of the system 10 is an arcuate contact 66. Such arcuate contact is positioned to overly at least a majority of the extent of the arcuate slot. It is secured to the fixed member through an adjustable bolt 68. Arcuate shoulders allow for the guiding of the motion forwardly and rearwardly within the arcuate slot to adjust the position of the arcuate contact. This varies the angle at which the feeler will generate a signal to indicate that it has been moved and that a low bridge is thereadjacent.

Next provided are a pair of electrical wires 70, 72. One electrical wire contracts the collar, the other wire contacts the arcuate contact. When electrically coupled through contact between the collar and its axial contact with the arcuate contact and its second wire an electrical circuit will be made due to the rotation of the feeler when contacted by a low bridge.

To effect these results, the collar, its rod and its axial contact on the rotatable member are made of an electrically conductive material as is the arcuate contact which is coupled with respect to the fixed member. The remaining components of the system are preferably fabricated of an electrically insulating material such as a plastic.

The last component of the system is a control panel 76. The control panel is positionable in the cab of the truck. It has electrical lines 78 coupling to the electrical wires of the fixed and rotatable members. It also has electrical lines coupled to a source of potential such as the battery of the truck in which it is utilized. Also within the control panel are an optical alarm 80 and an audio alarm 82. These are actuatable in response to the making of the contacts of the electrical wires. The control panel also has a switch 84 to decouple the power source from the contacts. This is for inactivating the entire device when so desired.

The present invention is an underpass bridge height detector and warning device that alerts a semitrailer driver that the bridge's height may be too low for their trailer. It consists of an electric control panel with a beeper alarm that is positioned under the dash, a steel terminal box mounted on top of the tractor's cab, a telescoping bridge feeler pole, a light emitting diode (LED) and the necessary electrical wiring. The system is wired from the ignition and the fuse box to the LED and to the outside mounted terminal box, and from the bridge feeler switch to the beeper alarm on the control panel. The bridge feeler pole can be extended and adjusted to the desired height. The pole switch is activated when the bridge feeler touches the underside of a bridge, causing the beeper alarm to sound and the light to flash.

The present invention is designed to gauge the height of a bridge, guide the driver, detect if the bridge is too low, and warn the driver by an audible and visual alarm. As the driver starts to go under an underpass that is lower than the trailer, the present invention alerts the driver so that he/she can avoid damage to the trailer and cargo.

Trucks getting stuck under bridges is an all too common occurrence. It is extremely expensive if the trailer is destroyed, as is often the case, and causes incredible traffic jams. The present invention should be appreciated by semitrailer drivers and the trucking companies for whom they drive.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved overhead warning detector comprising, in combination:

a terminal box positionable on the roof of a truck cab;

a vertically extending fixed member with a first cylindrical recess fixedly positioned with respect to the terminal box, the fixed member including a central aperture with an arcuate slot extending partly around the aperture at a common distance therefrom, the fixed member also including a circular shoulder extending therefrom with an opening over a minority of its extent with a spring retainer within the opening;

a vertically extending rotatable member with a circular recess and an aperture positionable co-axial with the aperture of the fixed member, the rotatable member having a cylindrical flange positionable outboardly of the shoulder and retainer in rotatable orientation with respect thereto, the flange of the rotatable member having a radial aperture extending therethrough and a radial tab extending into the retainer;

a cylindrical collar having a central aperture in axial alignment with the apertures of the rigid and rotatable members with an electrically conductive rod extending radially therefrom through the radial aperture of the rotatable member for rotation therewith, the rod also having an axial contact extending into the arcuate slot;

a telescoping bridge feeler extending from the rod, the feeler being adjustable in height to an elevation essentially corresponding to the elevational height of the highest point of a trailer of the truck;

a spring in resilient relationship interconnecting the tab and the retainer tending to rotate the rotatable member with respect to the fixed member and tending to hold the bridge feeler in an angle offset forwardly from the vertical but to allow rotation thereof rearwardly in response to contact with a low bridge;

an arcuate contact adustably positioned with respect to the arcuate slot;

electrical wires contacting the collar and arcuate contact adapted to couple the contacts upon rotation of the feeler when contacting a low bridge; and a control panel positionable in the cab with electrical lines coupling to the electrical wires, the control panel having a power source with an optical alarm and an audio alarm actuatable in response to the making of the contacts of the electrical wires, the control panel also having a switch to de-couple the power source from the contacts to inactivate the detector.

2. An overhead warning detector comprising:
a terminal box positionable on top of a truck cab;
a vertically extending fixed member having a central aperture with an arcuate slot extending partially therearound and fixedly positioned with respect to the terminal box, the fixed member also having a circular shoulder extending therefrom with an opening over a minority of its extent with a retainer within the opening;

a vertically extending rotatable member rotatably secured to the fixed member with a cylindrical flange positioned outboardly of the shoulder and retainer;

a bridge feeler extending radially from the rotatable member, the feeler being adjustable in height to an elevation corresponding to the elevational orientation of the highest point of the trailer of the truck;

resilient means interconnecting the fixed and rotatable members tending to hold the bridge feeler in an angle offset forwardly from the vertical but to allow rotation of the rotatable member and feeler rearwardly in response to contact with a low bridge; and a control box positionable in the cab of the truck with electrical leads coupling the fixed and rotatable members, the control panel having an alarm actuatable in response to the rotation of the rotatable member to activate the alarm.

3. The apparatus as set forth in claim 2 and further including a switch to inactivate the alarm in the control box.

4. The apparatus as set forth in claim 2 wherein the fixed member is formed with a first cylindrical recess fixedly positioned with respect to the aperture of the fixed member, the cylindrical flange positionable outboardly of the shoulder and retainer in rotatable orientation with respect thereto, the cylindrical flange having a radial aperture extending therethrough and a radial tab extending into the retainer.

5. The apparatus as set forth in claim 2 wherein the rotatable member is formed with a circular recess and an aperture positionable co-axial with the aperture of the fixed member, the rotatable member having a cylindrical flange positionable outboardly of the shoulder and retainer in rotatable orientation with respect thereto, the flange of the rotatable member having a radial aperture extending therethrough and a radial tab extending into the retainer.

6. The apparatus as set forth in claim 5 and further including a cylindrical collar having a central aperture in axial alignment with the apertures of the rigid and rotatable members with an electrically conductive rod extending radially therefrom through the radial aperture of the rotatable member for rotation therewith, the rod also having an axial contact extending into the arcuate slot.

7. The apparatus as set forth in claim 2 and further comprising electrical contacts including an axial contact coupled to the bridge feeler and an arcuate member adjustably positioned with respect to the fixed member with means to adjust the position of the arcuate member to vary the angular position of the feeler at which contact is made and an alarm is actuated.

* * * * *